US012300188B2

(12) United States Patent
Nien et al.

(10) Patent No.: US 12,300,188 B2
(45) Date of Patent: May 13, 2025

(54) BACKLIGHT DEVICE, TRANSPORT DEVICE INCLUDING BACKLIGHT DEVICE, AND CONTROL METHOD THEREOF

(71) Applicant: CARUX TECHNOLOGY PTE. LTD., Singapore (SG)

(72) Inventors: Chueh-Yuan Nien, Miao-Li County (TW); Yu-Chien Kao, Miao-Li County (TW); Li-Wei Sung, Miao-Li County (TW); Yi-Cheng Chang, Miao-Li County (TW)

(73) Assignee: CARUX TECHNOLOGY PTE. LTD., Singapore (SG)

( * ) Notice: Subject to any disclaimer, the term of this patent is extended or adjusted under 35 U.S.C. 154(b) by 0 days.

(21) Appl. No.: 18/335,326

(22) Filed: Jun. 15, 2023

(65) Prior Publication Data

US 2024/0038185 A1 Feb. 1, 2024

(30) Foreign Application Priority Data

Jul. 26, 2022 (CN) ......................... 202210886485.3

(51) Int. Cl.
*G09G 3/20* (2006.01)
*G09G 3/34* (2006.01)

(52) U.S. Cl.
CPC ......... *G09G 3/3426* (2013.01); *G09G 3/2096* (2013.01); *G09G 2320/0233* (2013.01); *G09G 2320/0626* (2013.01)

(58) Field of Classification Search
CPC ............... G09G 3/3426; G09G 3/2096; G09G 2320/0233; G09G 2320/0626
See application file for complete search history.

(56) References Cited

U.S. PATENT DOCUMENTS

| | | | | |
|---|---|---|---|---|
| 8,643,593 | B2 | 2/2014 | Chang et al. | |
| 9,963,071 | B2 | 5/2018 | Asai | |
| 2017/0256209 | A1* | 9/2017 | Kang | G09G 3/3413 |
| 2022/0165204 | A1* | 5/2022 | Kim | G09G 3/3696 |

FOREIGN PATENT DOCUMENTS

| | | | | |
|---|---|---|---|---|
| CN | 101790270 | * | 7/2010 | G02F 1/13357 |
| CN | 102651193 | B | 10/2014 | |
| CN | 105730337 | B | 4/2018 | |
| TW | I433115 | B | 4/2014 | |

* cited by examiner

*Primary Examiner* — Towfiq Elahi
(74) *Attorney, Agent, or Firm* — McClure, Qualey & Rodack, LLP

(57) ABSTRACT

A backlight device to provide a light source is provided. The backlight device includes a switching element, a graphics processor, and a graphics generator. The graphics processor is electrically connected to the switching element, and generates a partition data signal. The graphics generator is electrically connected to the switching element, and generates an image signal. When the backlight device operates in a normal mode, the switching element receives the partition data signal, so that different blocks of the backlight device have different levels of brightness. When the backlight device operates in a safe mode, the switching element receives the image signal, so that different blocks of the backlight device have the same level of brightness.

6 Claims, 8 Drawing Sheets

BACKLIGHT DEVICE, TRANSPORT DEVICE INCLUDING BACKLIGHT DEVICE, AND CONTROL METHOD THEREOF

CROSS REFERENCE TO RELATED APPLICATIONS

This application claims the benefit of China Application No. 202210886458.3, filed on Jul. 26, 2022, the entirety of which is incorporated by reference herein.

BACKGROUND OF THE DISCLOSURE

Field of the Invention

The present invention relates to an electronic device, and, in particular, to a backlight device, a transport device including a backlight device, and a control method thereof.

Description of the Related Art

Signals in a display device include image signals of the display part and backlight signals of the backlight part. Because the image signal needs to be converted into a local dimming image of the backlight through an algorithm and signal processing, there will be a time difference of one frame between the image signal of the display part and the backlight signal of the backlight part. For example, when the update frequency is 60 Hz, there will be a time difference of 1/60 seconds.

Although the above time difference does not have much impact on general document processing and video viewing, it will have an impact on the image from a reverse camera on the screen of a vehicle (such as a car) that are related to safety and response time. The picture on the screen may not correspond to the local dimming block of the backlight, especially at night or in a low-brightness environment. If emergency occurs at the rear of the vehicle, this delay in displaying the image could affect the judgment of the driver.

BRIEF SUMMARY OF THE DISCLOSURE

An embodiment of the present disclosure provides a backlight device. The backlight device includes a switching element, a graphics processor, and a graphics generator. The graphics processor is electrically connected to the switching element, and generates a partition data signal. The graphics generator is electrically connected to the switching element, and generates an image signal. When the backlight device operates in a normal mode, the switching element receives the partition data signal, so that different blocks of the backlight device have different levels of brightness. When the backlight device operates in a safe mode, the switching element receives the image signal, so that different blocks of the backlight device have the same level of brightness.

An embodiment of the present disclosure provides a transport device. The transport device includes a display and a backlight device. The backlight device includes a switching element, a graphics processor, and a graphics generator. The graphics processor is electrically connected to the switching element, and generates a partition data signal. The graphics generator is electrically connected to the switching element, and generates an image signal. When the backlight device operates in a normal mode, the switching element receives the partition data signal, so that different blocks of the backlight device have different levels of brightness. When the backlight device operates in a safe mode, the switching element receives the image signal, so that different blocks of the backlight device have the same level of brightness.

An embodiment of the present disclosure provides a method for regulating a backlight device including a switching element. The method includes the stages as detailed in the following paragraph. A graphics processor is provided to generate a partition data signal. A graphics generator is provided to generate an image signal. When the backlight device operates in a normal mode, the switching element receives the partition data signal, so that different blocks of the backlight device have different levels of brightness. When the backlight device operates in a safe mode, the switching element receives the image signal, so that different blocks of the backlight device have the same level of brightness.

BRIEF DESCRIPTION OF THE DRAWINGS

The disclosure can be more fully understood by reading the subsequent detailed description with references made to the accompanying figures. It should be understood that the figures are not drawn to scale in accordance with standard practice in the industry. In fact, it is allowed to arbitrarily enlarge or reduce the size of components for clear illustration. This means that many special details, relationships and methods are disclosed to provide a complete understanding of the disclosure.

DETAILED DESCRIPTION OF THE DISCLOSURE

Figure 1:
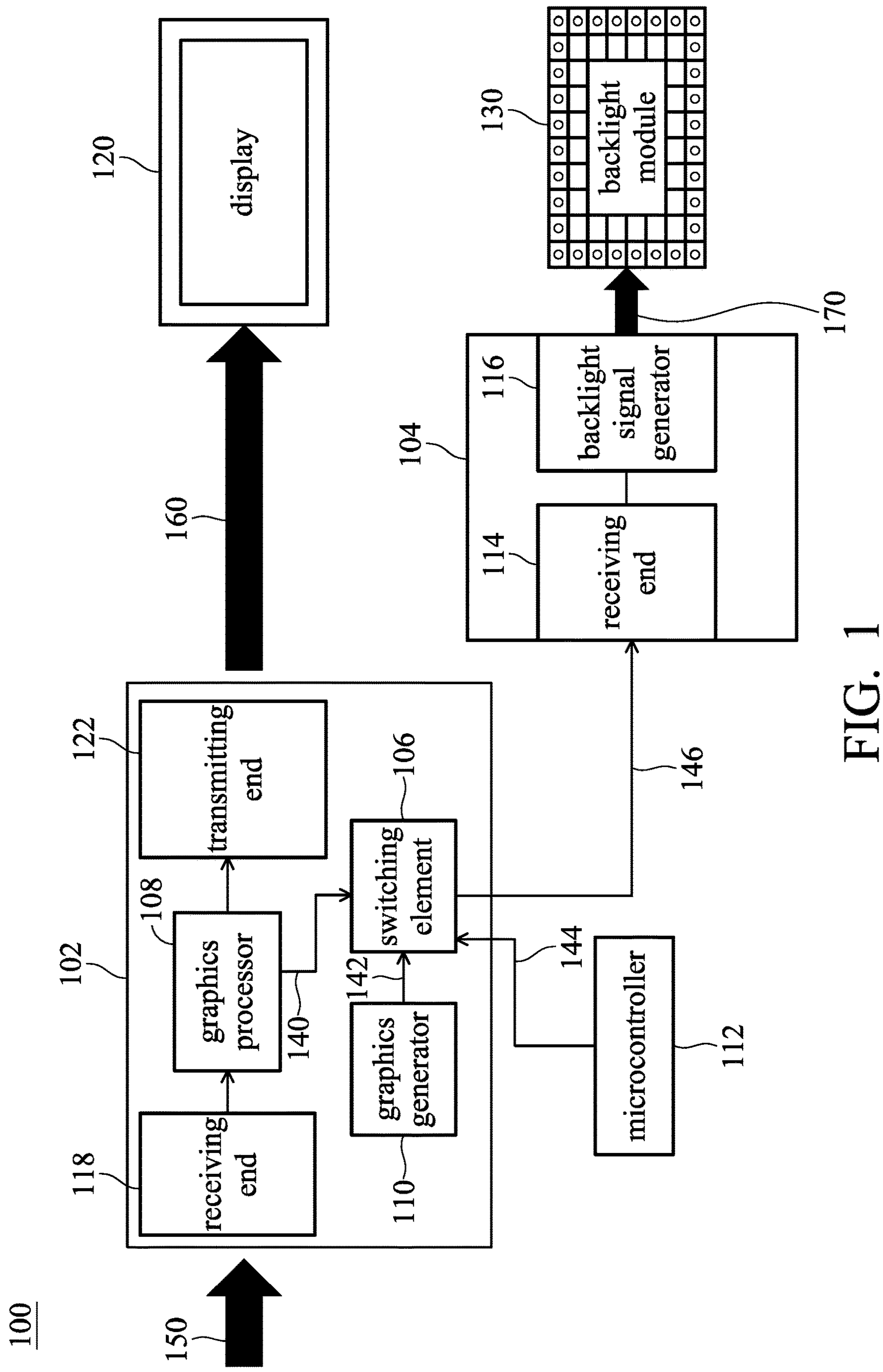
FIG. 1 is a schematic diagram of a backlight device 100 in accordance with some embodiments of the present disclosure.

In order to make the above purposes, features, and advantages of some embodiments of the present disclosure more comprehensible, the following is a detailed description in conjunction with the accompanying drawing.

Certain terms are used throughout the description and following claims to refer to particular components. As one skilled in the art will understand, electronic equipment manufacturers may refer to a component by different names. This document does not intend to distinguish between components that differ in name but not function. It is understood that the words “comprise”, “have” and “include” are used in an open-ended fashion, and thus should be interpreted to mean “include, but not limited to . . . ”. Thus, when the terms “comprise”, “have” and/or “include” used in the present disclosure are used to indicate the existence of specific technical features, values, method steps, operations, units and/or components. However, it does not exclude the possibility that more technical features, numerical values, method steps, work processes, units, components, or any combination of the above can be added.

The directional terms used throughout the description and following claims, such as: “on”, “up”, “above”, “down”, “below”, “front”, “rear”, “back”, “left”, “right”, etc., are only directions referring to the drawings. Therefore, the directional terms are used for explaining and not used for limiting the present disclosure. Regarding the drawings, the drawings show the general characteristics of methods, structures, and/or materials used in specific embodiments. However, the drawings should not be construed as defining or limiting the scope or properties encompassed by these embodiments. For example, for clarity, the relative size, thickness, and position of each layer, each area, and/or each structure may be reduced or enlarged.

When the corresponding component such as layer or area is referred to as being “on another component”, it may be directly on this other component, or other components may exist between them. On the other hand, when the component is referred to as being “directly on another component (or the variant thereof)”, there is no component between them. Furthermore, when the corresponding component is referred to as being “on another component”, the corresponding component and the other component have a disposition relationship along a top-view/vertical direction, the corresponding component may be below or above the other component, and the disposition relationship along the top-view/vertical direction is determined by the orientation of the device.

It should be understood that when a component or layer is referred to as being “connected to” another component or layer, it can be directly connected to this other component or layer, or intervening components or layers may be present. In contrast, when a component is referred to as being “directly connected to” another component or layer, there are no intervening components or layers present.

The electrical connection or coupling described in this disclosure may refer to direct connection or indirect connection. In the case of direct connection, the endpoints of the components on the two circuits are directly connected or connected to each other by a conductor line segment, while in the case of indirect connection, there are switches, diodes, capacitors, inductors, resistors, other suitable components, or a combination of the above components between the endpoints of the components on the two circuits, but the intermediate component is not limited thereto.

The words “first”, “second”, “third”, “fourth”, “fifth”, and “sixth” are used to describe components. They are not used to indicate the priority order of or advance relationship, but only to distinguish components with the same name.

It should be noted that the technical features in different embodiments described in the following can be replaced, recombined, or mixed with one another to constitute another embodiment without departing from the spirit of the present disclosure.

Figure 2:
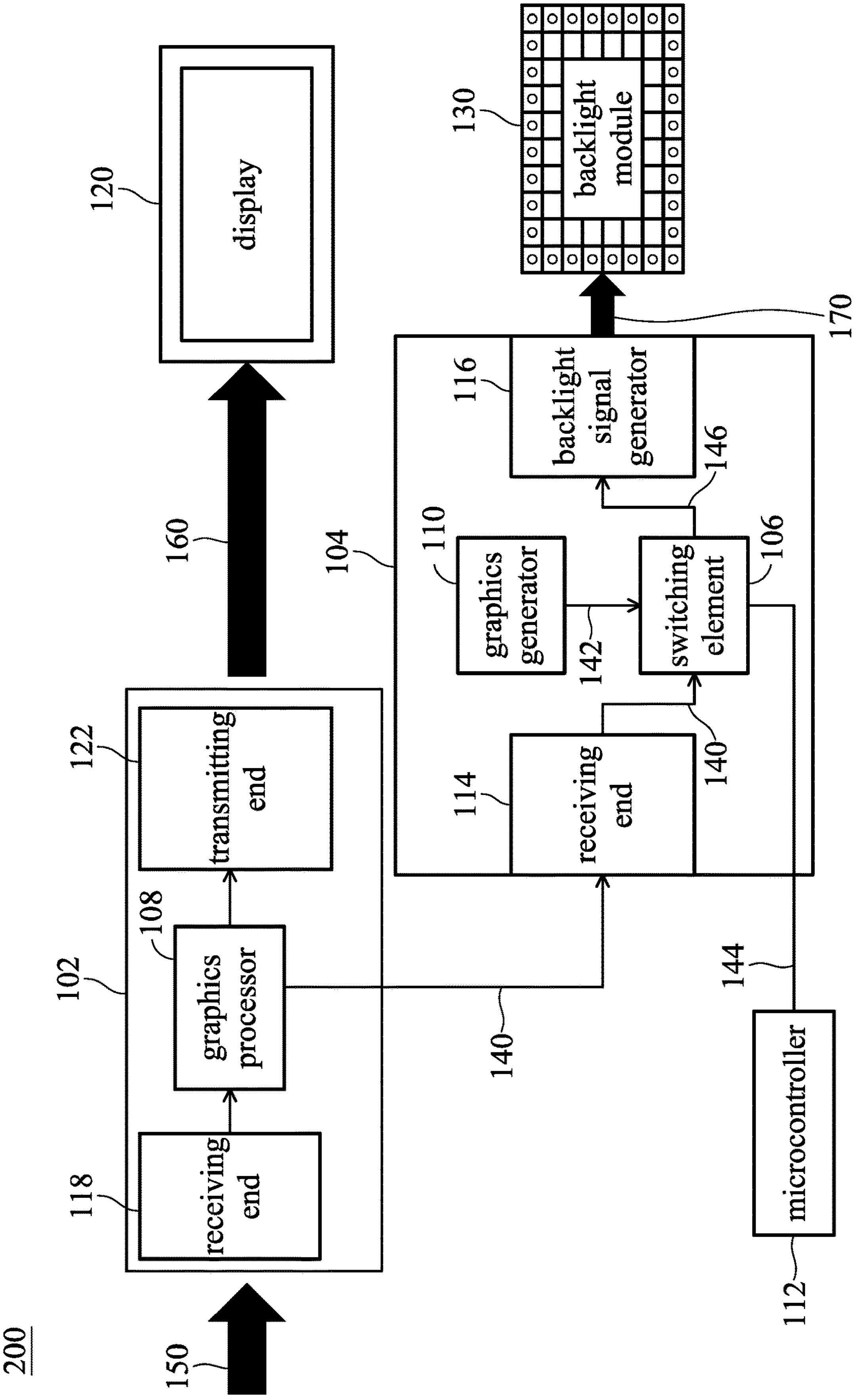
FIG. 2 is a schematic diagram of a backlight device 200 in accordance with some embodiments of the present disclosure.

In the present disclosure, the backlight device in FIG. 1 or the backlight device 200 in FIG. 2 can be disposed in an electronic device. The electronic device in the present disclosure may include a display device, a backlight device, an antenna device, a sensing device, or a splicing device, etc., but is not limited thereto. The electronic device may be a bendable or flexible electronic device. The display device may be a non-self-luminous display device or a self-luminous display device. The antenna device may be a liquid crystal antenna device or a non-liquid crystal antenna device, and the sensing device may be a sensing device for sensing capacitance, light, heat, or ultrasonic waves, but is not limited thereto. The electronic components may include passive and active components, such as capacitors, resistors, inductors, diodes, transistors, and the like. The diodes may include light-emitting diodes or photodiodes. The light-emitting diode may include organic light-emitting diode (OLED), inorganic light-emitting diode, micro-LED, mini-LED, quantum dot light-emitting diode (QLED, QDLED), other suitable materials or a combination of the above materials, but is not limited thereto. The splicing device may be, for example, a splicing display device or a splicing antenna device, but is not limited thereto. In addition, the display device in the electronic device may be a color display device or a monochrome display device, and the shape of the electronic device may be rectangular, circular, polygonal, a shape with curved edges, or other suitable shapes. In addition, the electronic device described below uses, as an example, the sensing of a touch through an embedded touch device, but the touch-sensing method is not limited thereto, and another suitable touch-sensing method can be used provided that it meets all requirements.

FIG. 1 is a schematic diagram of a backlight device 100 in accordance with some embodiments of the present disclosure. As shown in FIG. 1, the backlight device 100 includes a chip 102 and a chip 104. In some embodiments, the chip 102 includes an application specific integrated circuit (ASIC), but the present disclosure is not limited thereto. In some embodiments, the backlight device 100 provides a light source, but the present disclosure is not limited thereto. In some embodiments, the chip 104 includes a backlight driving circuit, but the present disclosure is not limited thereto. In some embodiments, the chip 102 includes a switching element 106, a graphics processor 108, a graphics generator 110, a receiving end 118, and a transmitting end 122. The graphics processor 108 is electrically connected to the switching element 106, and generates a partition data signal 140. In detail, the chip 102 receives an image signal 150 through the receiving end 118. Then, the graphics processor 108 performs image processing on the image signal 150 and generates the partition data signal 140 correspondingly. In some embodiments, the graphics processor 108 detects the brightness of the image signal 150 and generates the partition data signal 140 correspondingly according to the brightness of the image signal 150. In some embodiments, the graphics processor 108 is an arithmetic unit for processing a signal source and correspondingly generating the partition data signal 140, but the present disclosure is not limited thereto.

For example, the display 120 includes an LCD display, but the present disclosure is not limited thereto. The display 120 in FIG. 1 includes a first display portion, a second display portion, and a third display portion (not shown). The backlight device in FIG. 1 includes mini LEDs, but the present disclosure is not limited thereto. The first display portion of the display 120 corresponds to the first backlight unit group of the backlight device. The second display portion of the display 120 corresponds to the second backlight unit group of the backlight device. The third display portion of the display 120 corresponds to the third backlight unit group of the backlight device. When the graphics processor 108 detects that the brightness of the image signal 150 in the first display portion is higher than that of the second display portion, and the brightness of the second display portion is higher than the third display portion, in the partition data signal 140 output by the graphics processor 108, the output brightness set by the first backlight unit group is higher than the output brightness set by the second backlight unit group, and the output brightness set by the second backlight unit group is higher than the output brightness set by the third backlight unit group. For example, the brightness of the first backlight unit group is set as 100%, the brightness of the second backlight unit group is set as 60%, and the brightness of the third backlight unit group is set as 30%, but the present disclosure is not limited thereto. In some embodiments, the chip 102 sends the image signal 160 after image processing to the display 120 through the transmitting end 122. The display 120 displays correspondingly according to the image signal 160.

In some embodiments, the graphics generator 110 is electrically connected to the switching element 106, and generates an image signal 142. The image signal 142 includes pre-programed brightness information corresponding to each backlight unit, but the present disclosure is not limited thereto. For example in the previous paragraph, in the image signal 142, the brightness of the first backlight unit group can be pre-programmed to 100%, the brightness of the second backlight unit group can be pre-programmed to 0%, and the brightness of third backlight unit group can be pre-programmed to 0%, but the present disclosure is not limited thereto.

The switching element 106 receives the partition data signal 140 from the graphics processor 108 or receives the image signal 142 from the graphics generator 110 according to a switching control signal 144 from the microcontroller 112. For example, when the backlight device 100 operates in a normal mode, the switching control signal 144 is at the logic low level (for example, “0”), the switching element 106 receives the partition data signal 140 from the graphics processor 108. When the backlight device 100 operates in a safe mode (for example, when just starting up, reversing, and turning on the left/right rearview mirror), the switching control signal 144 is at the logic high level (for example, “1”), the switching element 106 receives the image signal 142 from the graphics generator 110. Then, the switching element 106 sends a backlight data signal 146 to the chip 104. In detail, when the switching control signal 144 is at the logic low level (for example, “0”), the backlight data signal 146 is the same as the partition data signal 140. When the switching control signal 144 is at the logic high level (for example, “1”), the backlight data signal 146 is the same as the image signal 142.

In some embodiments, the chip 104 includes a receiving end 114 and a backlight signal generator 116. The chip 104 receives the backlight data signal 146 (e.g., the partition data signal 140 or the image signal 142) through the receiving end 114. After that, the backlight signal generator 116 then converts the backlight data signal 146 into a backlight driving signal 170 and sends the backlight driving signal 170 to the backlight module 130. The backlight module 130 correspondingly adjusts the brightness of each backlight unit according to the backlight driving signal 170. For example, when the switching control signal 144 is at the logic low level (e.g., “0”), that is, the backlight data signal 146 is the same as the partition data signal 140, the backlight signal generator 116 converts the partition data signal 140 into the backlight driving signal 170 to drive the backlight module 130. When the switching control signal 144 is at the logic high level (e.g., “1”), that is, the backlight data signal 146 is the same as the image signal 142, the backlight signal generator 116 converts the image signal 142 into the backlight driving signal 170 to drive the backlight module 130. In some embodiments, the transport device may include the display 120, the backlight device 100, and a microcontroller 112. The backlight device 100 provides a light source for the display 120. The microcontroller 112 provides the switching control signal 144, and the switching control signal 144 controls the switching element 106 to receive the image signal 142 provided by the graphics generator 110 or receive the partition data signal 140 provided by the graphics processor 108. When the transport device is in a normal driving state, the backlight device operates in the normal mode. When the transport device is reversing or just starting up, the transport device may trigger a microcontroller to provide a switching control signal, so that the backlight device operates in the safe mode.

FIG. 2 is a schematic diagram of a backlight device 200 in accordance with some embodiments of the present disclosure. As shown in FIG. 2, the backlight device 200 includes a chip 102 and a chip 104. In some embodiments, the chip 102 includes an ASIC, but the present disclosure is not limited thereto. In some embodiments, the chip 104 includes a backlight driving circuit, but the present disclosure is not limited thereto. The chip 102 includes the graphics processor 108, the receiving end 118, and the transmitting end 122. The chip 104 includes the switching element 106, the graphics generator 110, the receiving end 114, and the backlight signal generator 116. To put it simply, the difference between FIG. 2 and FIG. 1 is that the switching element 106 and the graphics generator 110 in FIG. 2 are disposed in the chip 104, while the switching element 106 and the graphics generator 110 in FIG. 1 are disposed in the chip 102. In other words, the graphics processor 108 and the switching element 106 in FIG. 2 are disposed in different chips. In contrast, the graphics processor 108 and the switching element 106 in FIG. 1 are disposed in the same chip. The chip 102 sends the image signal 160 after image processing to the display 120 through the transmitting end 122. The display 120 displays correspondingly according to the image signal 160. In some embodiments, the transport device includes the display 120, the backlight device 200, and a microcontroller 112. The backlight device 200 provides a light source for the display 120. The microcontroller 112 provides the switching control signal 144. The switching control signal 144 controls the switching element 106 to receive the image signal 142 provided by the graphics generator 110 or the partition data signal 140 provided by the graphics processor 108. When the transport device is in a normal driving state, the backlight device operates in the normal mode. When the transport device is reversing or just starting up, the transport device may trigger a microcontroller to provide a switching control signal, so that the backlight device operates in the safe mode.

The graphics processor 108 is electrically connected to the switching element 106 through the receiving end 114 of the chip 104. The graphics processor 108 performs image processing on the image signal 150 and correspondingly generates the partition data signal 140. In some embodiments, the graphics processor 108 detects the brightness of the image signal 150 and generates the partition data signal 140 correspondingly according to the brightness of the image signal 150. The chip 140 receives the partition data signal 140 from the graphics processor 108 through the receiving end 114. The graphics generator 110 is electrically connected to the switching element 106, and generates an image signal 142. The image signal 142 includes pre-programmed brightness information corresponding to each backlight unit, but the present disclosure is not limited thereto.

The switching element 106 receives the partition data signal 140 from the graphics processor 108 or the image signal 142 from the graphics generator 110 according to a switching control signal 144 from the microcontroller 112. For example, when the backlight device 100 operates in the normal mode, the switching control signal 144 is at the logic low level (for example, "0"), the switching element 106 receives the partition data signal 140 from the receiving end 114. When the backlight device 100 operates in the safe mode, the switching control signal 144 is at the logic high level (for example, "1"), the switching element 106 receives the image signal 142 from the graphics generator 110. Then, the switching element 106 sends a backlight data signal 146 to the backlight signal generator 116. In detail, when the switching control signal 144 is at the logic low level (for example, "0"), the backlight data signal 146 is the same as the partition data signal 140. When the switching control signal 144 is at the logic high level (for example, "1"), the backlight data signal 146 is the same as the image signal 142.

Similarly, the backlight signal generator 116 converts the backlight data signal 146 into a backlight driving signal 170 and sends the backlight driving signal 170 to the backlight module 130. The backlight module 130 adjusts the brightness of each backlight unit correspondingly according to the backlight driving signal 170. For example, when the switching control signal 144 is at the logic low level (for example, "0"), that is, the backlight data signal 146 is equal to the partition data signal 140, the backlight signal generator 116 converts the partition data signal 140 into the backlight driving signal 170 to drive the backlight module 130. When the switching control signal 144 is at the logic high level (for example, "1"), that is, the backlight data signal 146 is the same as the image signal 142, the backlight signal generator 116 converts the image signal 142 into the backlight driving signal 170 to drive the backlight module 130.

Figure 3B:
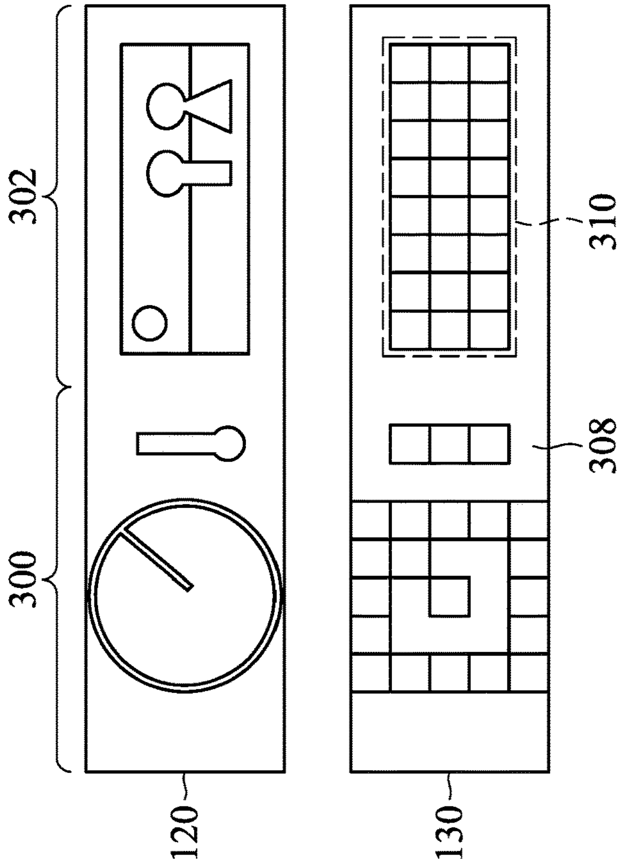
FIG. 3B is a schematic diagram of a driving picture in a safe mode in accordance with some embodiments of the present disclosure.
Figure 3A:
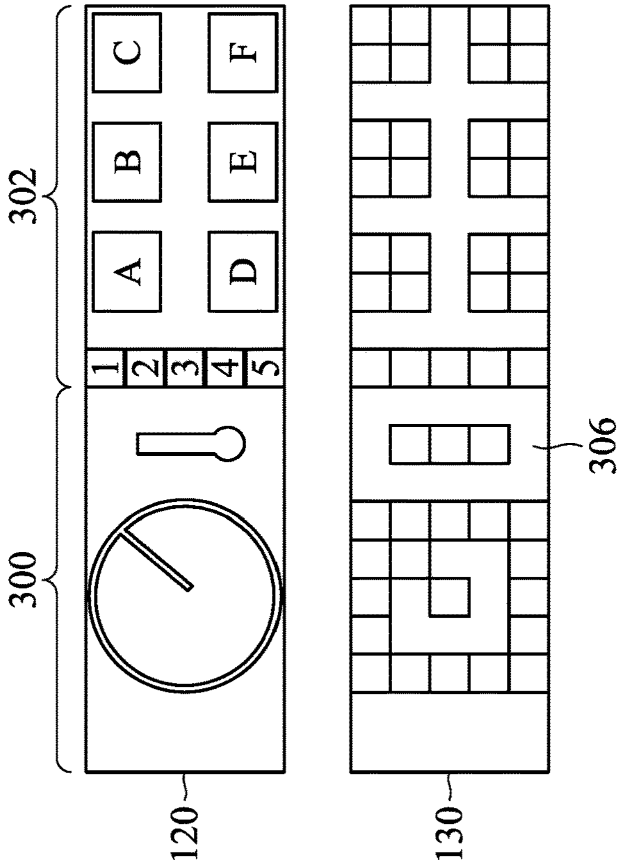
FIG. 3A is a schematic diagram of a driving picture in a normal mode in accordance with some embodiments of the present disclosure.

FIG. 3A is a schematic diagram of a driving picture in a normal mode in accordance with some embodiments of the present disclosure. As shown in FIG. 3A, when a transport device is in a normal driving state, the backlight module 130 operates in the normal mode. The driving picture is formed by the display picture of the display 120 and the light source provided by the backlight module 130. In some embodiments, the driving picture includes a dashboard 300 and a center console 302. A region 306 includes all backlight elements of the backlight module 130 (e.g., the full screen). In some embodiments of FIG. 3A, all the backlight elements in the region 306 may perform the function of local dimming, but the present disclosure is not limited thereto. FIG. 3B is a schematic diagram of a driving picture in a safe mode in accordance with some embodiments of the present disclosure. As shown in FIG. 3B, a region 308 includes a portion of backlight elements of the backlight module 130 (e.g., the portion screen). A region 310 includes another portion of the backlight elements of the backlight module 130. In some embodiments of FIG. 3B, the portion of the backlight elements in the region 308 may perform the function of local dimming, but the portion of the backlight elements in the region 310 may not perform the function of local dimming. For example, the portion of the backlight elements is in a fully bright state (e.g., the brightness is 100%), but the present disclosure is not limited thereto. In other words, in some embodiments of FIG. 3B, the backlight device can operate in both normal mode (e.g., region 308) and safe mode (region 310).

Figure 4:
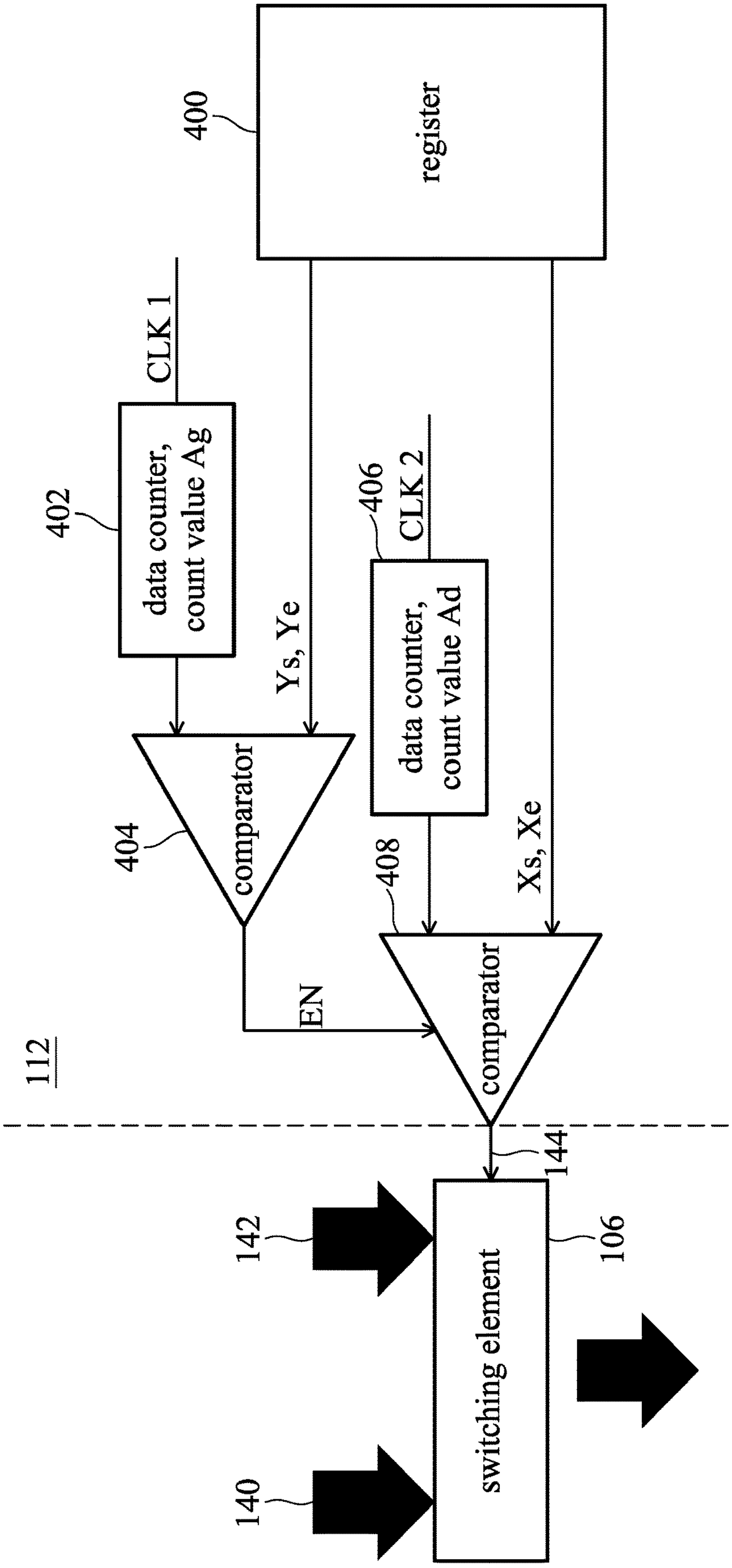
FIG. 4 is a detailed schematic diagram of a switching element 106 controlled by a microcontroller 112 in FIG. 1 or FIG. 2 in accordance with some embodiments of the present disclosure.

FIG. 4 is a detailed schematic diagram of a switching element 106 controlled by a microcontroller 112 in FIG. 1 or FIG. 2 in accordance with some embodiments of the present disclosure. As shown in FIG. 4, the microcontroller 112 includes a register 400, a data counter 402, a comparator 404, a data counter 406, and a comparator 408. In some embodiments, the register 400 stores the coordinates of the blocks in the backlight module 130 where the local dimming is turned off. For example, the coordinate Ys is the vertical starting coordinate of the block where the local dimming is turned off, the coordinate Ye is the vertical ending coordinate of the block where the local dimming is turned off, the coordinate Xs is the horizontal starting coordinate of the block where the local dimming is turned off, and the coordinate Xe is the horizontal ending coordinate of the block where the local dimming is turned off. In other words, the coordinate Ys, the coordinate Ye, the coordinate Xs, and the coordinate Xe together define the block where the local dimming is turned off.

In some embodiments, the data counter 402 counts the gate clock signal CLK1. For example, the count value of the data counter 402 is Ag. The input ends of the comparator 404 respectively receive the gate clock signal CLK1 and the coordinates Ys and Ye. In some embodiments, the comparator correspondingly outputs an enable signal EN to the control end of the comparator 408 according to the count value Ag and the values of the coordinates Ys and Ye. For example, when the condition $Ys<Ag<Ye$ is met, the comparator 404 outputs the enable signal EN which is at the logic high level (for example, "1") to the comparator 408. When the condition $Ys<Ag<Ye$ is not met, the comparator 404 does not output the enable signal EN, or outputs the enable signal EN which is at the low logic level (for example, "0") to the comparator 408. Similarly, the data counter 406 counts the gate clock signal CLK1. For example, the count value of the data counter 406 is Ad. The input ends of the comparator 408 respectively receive the source clock signal CLK2 and the coordinates Xs and Xe. The control end of the comparator 408 receives the enable signal EN from the comparator 404.

In some embodiments, the comparator 408 correspondingly outputs the switching control signal 144 to the switching element 106 according to the count value Ad and the values of the coordinates Xs and Xe. For example, when the condition $Xs<Ad<Xe$ is met and the enable signal EN is at the logic high level (for example, "1"), the comparator 408 outputs the switching control signal 144 which is at the logic high level (for example, "1") to the switching element 106. When the condition $Xs<Ad<Xe$ is not met or the enable signal EN is at the logic low level (for example, "0"), the comparator 408 does not output the switching control signal 144, or outputs the switching control signal 144 which is at the logic low level (for example, "0") to the switching element 106.

Then, the switching element 106 receives the partition data signal 140 or the image signal 142 according to the switching control signal 144. For example, when the switching control signal 144 is at the logic low level (for example, "0"), the switching element 106 receives the partition data signal 140, and correspondingly outputs the partition data signal 140. In contrast, when the switching control signal 144 is at the logic high level (for example, "1"), the switching element 106 receives the image signal 142, and correspondingly outputs the image signal 142. To sum up, when the conditions of Ys<Ag<Ye and Xs<Ad<Xe are met, the switching element 106 outputs the image signal 142. When the conditions of Ys<Ag<Ye and Xs<Ad<Xe are not met, the switching element 106 outputs the partition data signal 140.

Figure 5B:
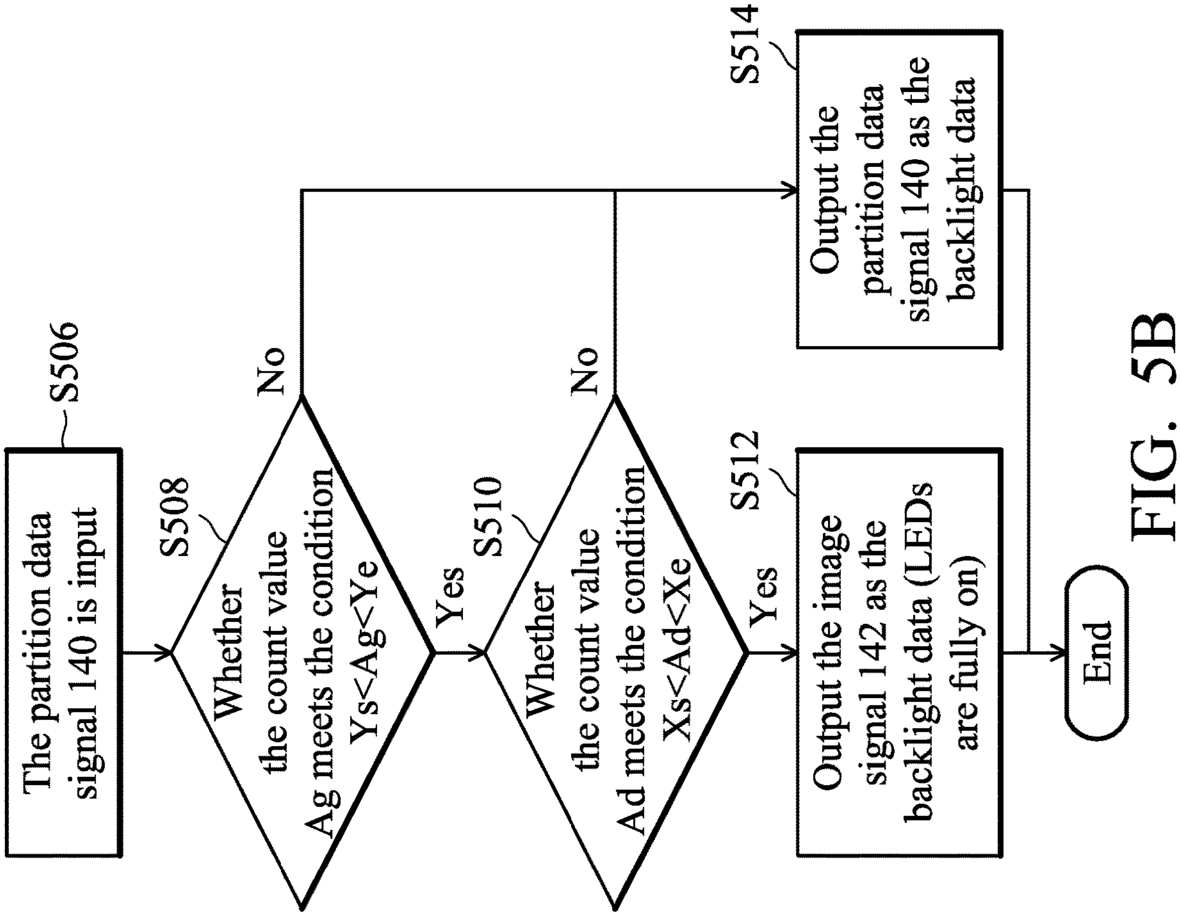
FIG. 5A and FIG. 5B are operational flow charts of the microcontroller 112 in FIG. 1 or FIG. 2 forcing part of the backlight units to be fully on in accordance with some embodiments of the present disclosure.
Figure 5A:
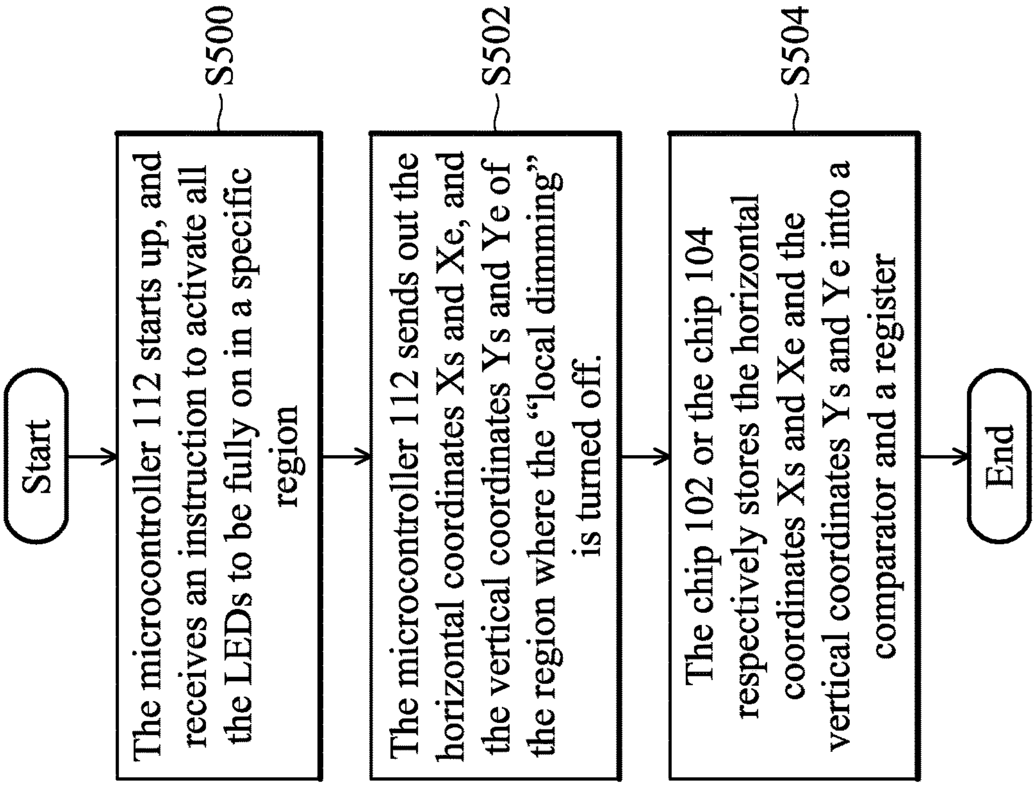

FIG. 5A and FIG. 5B are operational flow charts of the microcontroller 112 in FIG. 1 or FIG. 2 forcing part of the backlight units to be fully on in accordance with some embodiments of the present disclosure. As shown in FIG. 5A, at the beginning of the operation process, in step S500, the microcontroller 112 starts up, and receives an instruction to activate all the LEDs to be fully on in a specific region (for example, the region 310 in FIG. 3B). In some embodiments, the instruction to activate the LEDs in the specific region to be fully on may come from a vehicle computer, but the present disclosure is not limited thereto. In step S502, the microcontroller 112 sends out the horizontal coordinates Xs and Xe, and the vertical coordinates Ys and Ye of the (specific) region where the "local dimming" is turned off. The coordinate Xs is the horizontal starting coordinate. The coordinate Xe is the horizontal ending coordinate. The coordinate Ys is the vertical starting coordinate. The coordinate Ye is the vertical ending coordinate. In step S504, the chip 102 or the chip 104 respectively stores the horizontal coordinates Xs and Xe and the vertical coordinates Ys and Ye into a comparator (e.g., the comparators 404 and 408 in FIG. 4) and a register (e.g., the register 400 in FIG. 4). After that, the operation process ends. In other words, steps S500 to S504 are the pre-steps or outline steps of the operation process of the microcontroller 112 forcing some of the backlight units to be fully on, but the present disclosure is not limited thereto.

As shown in FIG. 5B, in step S506, the partition data signal 140 is input to the switching element 106. In step S508, the microcontroller 112 determines whether the count value Ag meets the condition Ys<Ag<Ye. In some embodiments, the count value Ag is the count value of the data counter 402 in FIG. 4. If the count value Ag meets the condition Ys<Ag<Ye, the microcontroller 112 continues to perform step S510. In step S510, the microcontroller 112 determines whether the count value Ad meets the condition Xs<Ad<Xe. In some embodiments, the count value Ad is the count value of the data counter 406 in FIG. 4. If the count value Ad meets the condition Xs<Ad<Xe, the switching element 106 continues to perform step S512. In step S512, the switching element 106 outputs the image signal 142 as the backlight data, so that the LEDs in the specific region are fully on, and the operation process ends. In contrast, in step S508, if the count value Ag does not meet the condition Ys<Ag<Ye, the switching element 106 directly performs step S514. In step S514, the switching element 106 outputs the partition data signal 140 as the backlight data, so that the LEDs outside the specific region still operate in the function of "local dimming". Similarly, in step S510, if the count value Ad does not meet the condition Xs<Ad<Xe, the switching element 106 also performs step S514, and outputs the partition data signal 140 as the backlight data, so that the LEDs outside the specific region still operate in the function of "local dimming", and the operation process ends.

Figure 6B:
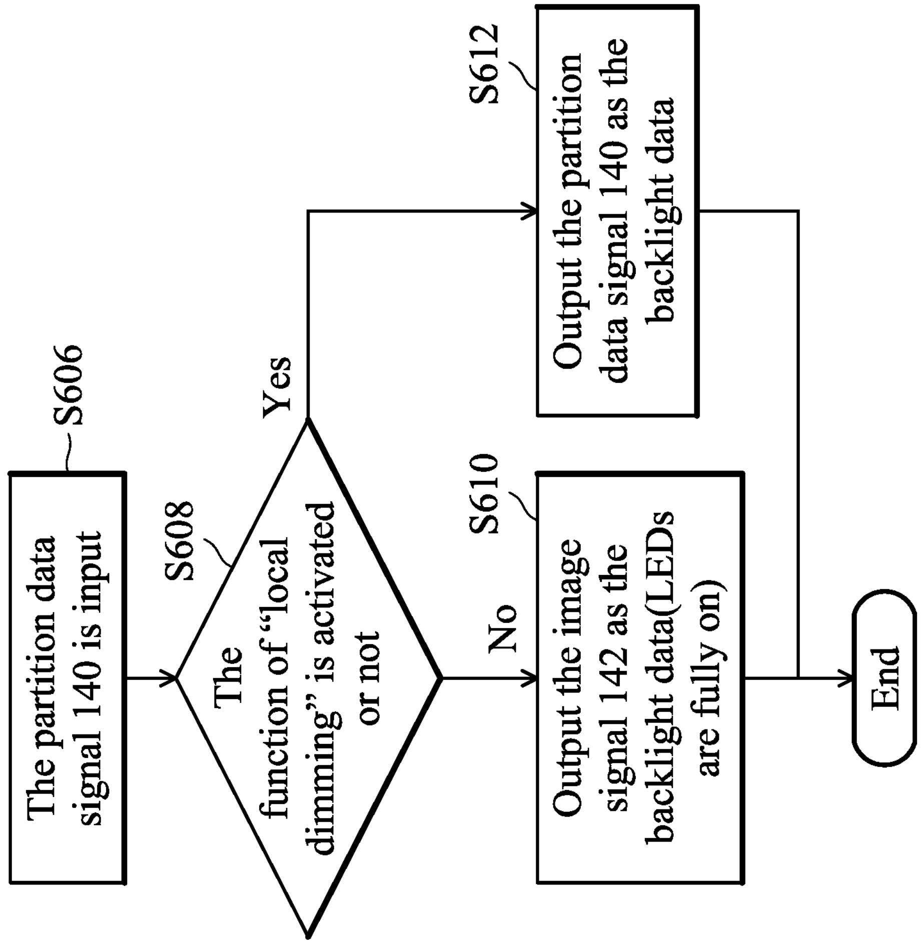
FIG. 6A and FIG. 6B are operational flow charts of the microcontroller 112 in FIG. 1 or FIG. 2 forcing all of the backlight units to be fully on in accordance with some embodiments of the present disclosure.
Figure 6A:
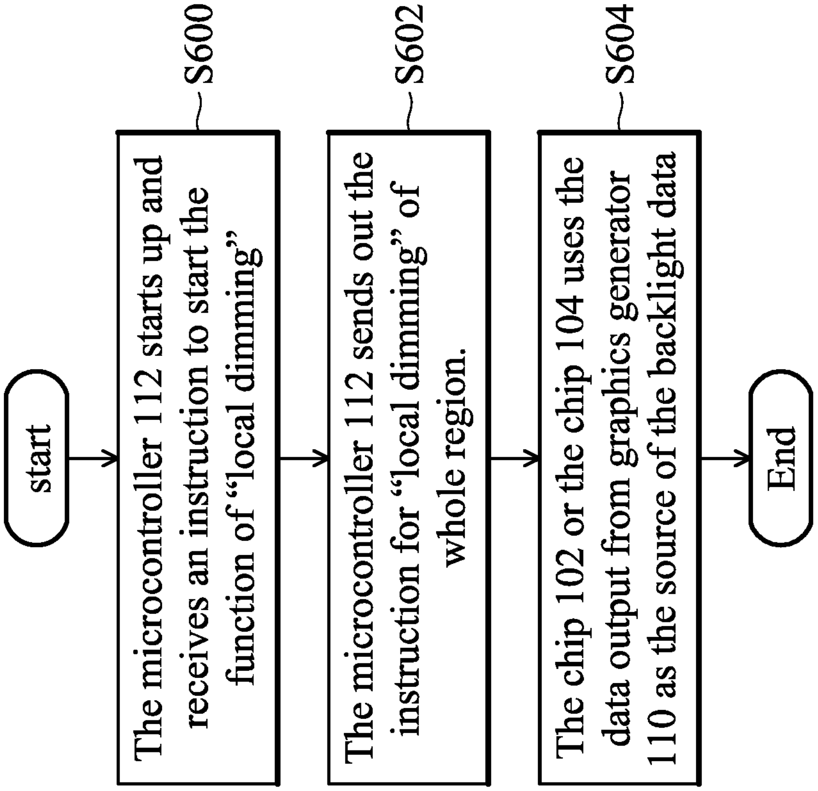

FIG. 6A and FIG. 6B are operational flow charts of the microcontroller 112 in FIG. 1 or FIG. 2 forcing all of the backlight units to be fully on in accordance with some embodiments of the present disclosure. As shown in FIG. 6A, at the beginning of the operation process, in step S600, the microcontroller 112 starts up and receives an instruction to start the function of "local dimming". In some embodiments, the instruction to start the function of "local dimming" may come from a vehicle computer, but the present disclosure is not limited thereto. In step S602, the microcontroller 112 sends out the instruction for "local dimming" of whole region. In step S604, the chip 102 or the chip 104 uses the data output from graphics generator 110 as the source of the backlight data. Then, the operation process ends. In other words, steps S600 to S604 are the pre-steps or outline steps of the operation process of the microcontroller 112 forcing all of the backlight units to be fully on, but the present disclosure is not limited thereto.

As shown in FIG. 6B, in step S606, the partition data signal 140 is input to the switching element 106. In step S608, the microcontroller 112 determines whether to start the function of "local dimming" of the LEDs being fully on. If the microcontroller 112 determines the function of "local dimming" of the LEDs being fully on is activated, the switching element 106 performs step S612. In step S612, the switching element 106 outputs the partition data signal 140 as the backlight data, so that different blocks of the backlight device in a region (e.g., the region 308) have different levels of brightness, and the operation process ends. In contrast, if the microcontroller 112 determines the function of "local dimming" of the LEDs being fully on is not activated, the switching element 106 performs step S610. In step S610, the switching element 106 outputs the image signal 142 as the backlight data, so that different blocks of the backlight device in a region (e.g., the region 310) have the same level of brightness, and the operation process ends. It should be noted that the "same" level of brightness here refers to the brightness of the light-emitting element under the same control conditions, ignoring the difference of the light-emitting element itself (for example, the difference caused by a process error). For example, the light-emitting elements can be mini LEDs, and the mini LEDs in one region of the backlight device are all driven by a current of 10 nA. If there is a 0.005% difference in brightness between two mini LEDs, the two mini LEDs are regarded as having the same level of brightness.

Figure 7A:
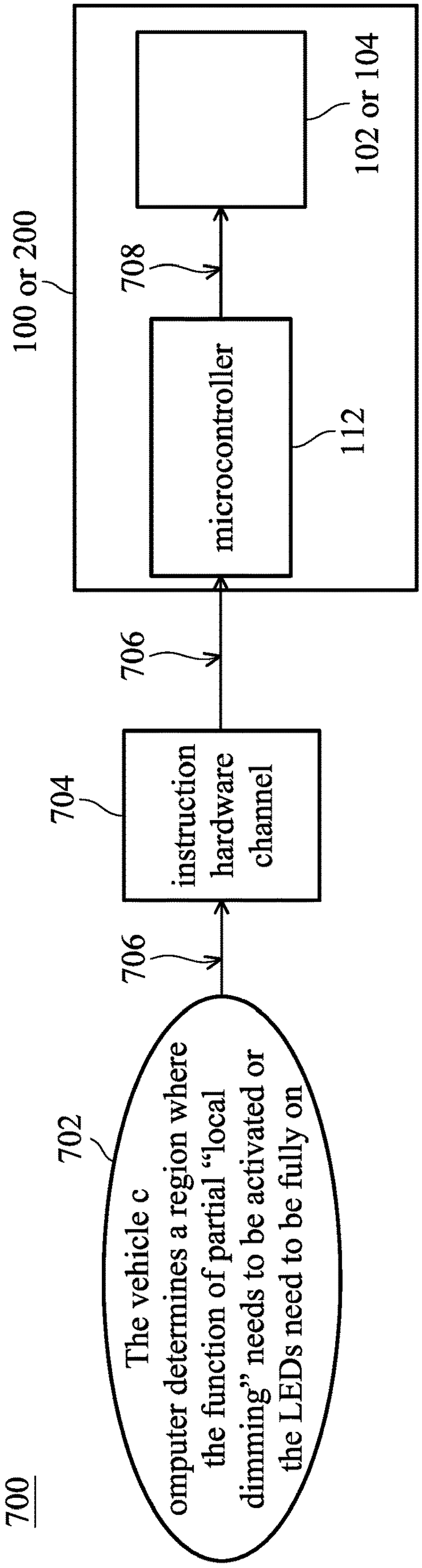
FIG. 7A and FIG. 7B are schematic diagrams of a vehicle computer forcing the backlight units to be fully on in accordance with some embodiments of the present disclosure.
Figure 7B:
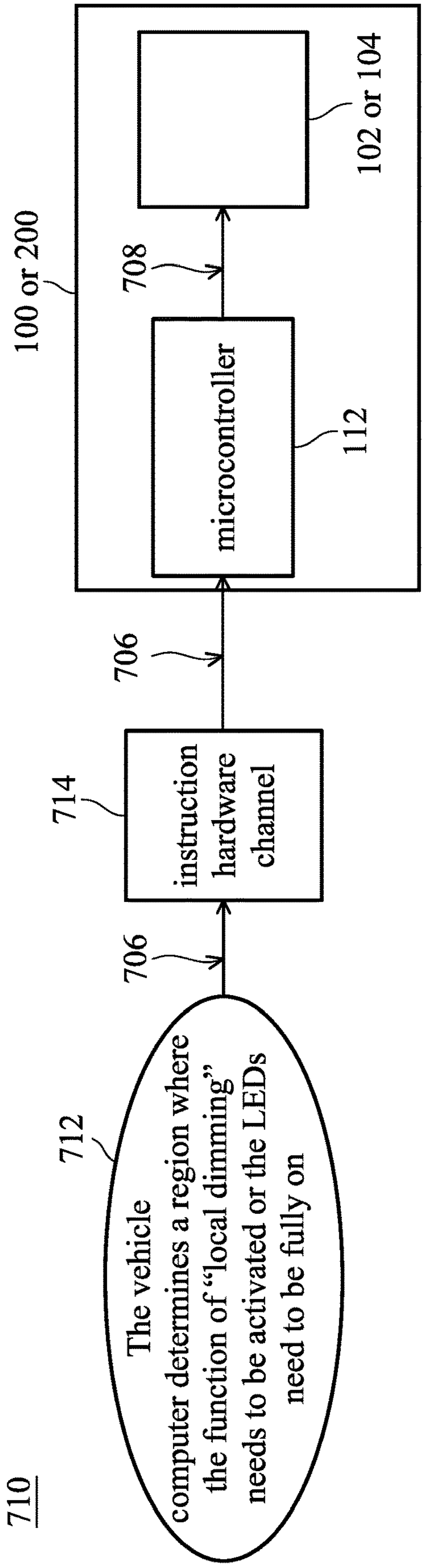

FIG. 7A and FIG. 7B are schematic diagrams of a vehicle computer forcing the backlight units to be fully on in accordance with some embodiments of the present disclosure. As shown in FIG. 7A, in pattern 702 of scenario 700, the vehicle computer determines a region where the function of partial "local dimming" needs to be activated or the LEDs need to be fully on. Then, the vehicle computer sends the information of the region where the LEDs need to be fully on to the backlight device 100 or the backlight device 200 through an instruction 706 and an instruction hardware channel 704. After that, the microcontroller 112 sends the horizontal coordinates Xs and Xe and the vertical coordinates Ys and Ye of the region where the LEDs need to be fully on to the chip 102 or the chip 104 through the instruction 708 according to the information of the region where the LEDs need to be fully on in the instruction 706. In other words, in scenario 700, the microcontroller 112 can first define which regions enable the full-on LED function, and then the vehicle computer specifies the region where the full-on LED function is actually enabled.

As shown in FIG. 7B, in pattern 712 of scenario 710, the vehicle computer determines a region where the function of "local dimming" needs to be activated or the LEDs need to be fully on. Then, the vehicle computer sends the information of the region where the LEDs need to be fully on to the backlight device 100 or the backlight device 200 through an instruction 716 and an instruction hardware channel 714. Then, the vehicle computer sends the horizontal coordinates Xs and Xe and the vertical coordinates Ys and Ye of the region where the LEDs need to be fully on to the chip 102 or the chip 104 through the instruction 718. In other words, in scenario 710, the vehicle computer can send out the horizontal coordinates Xs and Xe and the vertical coordinates Ys and Ye of the region where the LEDs need to be fully on itself.

Figure 8:
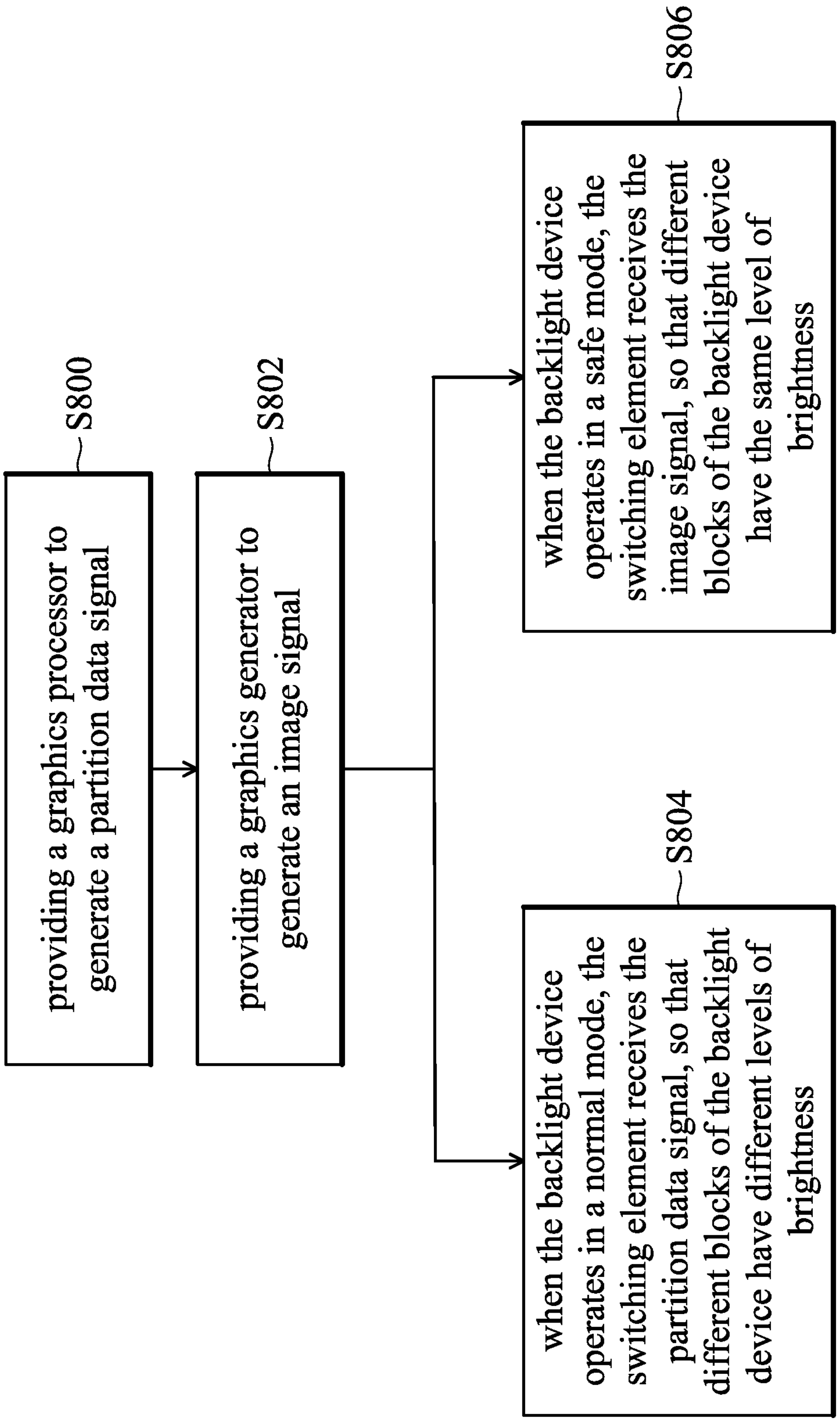
FIG. 8 is a flow chart for controlling the backlight device 100 in FIG. 1 or the backlight device 200 in FIG. 2 in accordance with some embodiments of the present disclosure.

FIG. 8 is a flow chart for controlling the backlight device 100 in FIG. 1 or the backlight device 200 in FIG. 2 in accordance with some embodiments of the present disclosure. As shown in FIG. 8, the method for controlling a backlight device includes the stages as detailed in the following paragraph. A graphics processor is provided to generate a partition data signal (step S800). A graphics generator is provided to generate an image signal (step S802). When the backlight device operates in a normal mode, the switching element receives the partition data signal, so that different blocks of the backlight device have different levels of brightness (step S804). When the backlight device operates in a safe mode, the switching element receives the image signal, so that different blocks of the backlight device have the same level of brightness (step S806).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A transport device, comprising:

a display;

a backlight device, configured to provide a light source for the display, comprising:

a switching element;

a graphics processor, electrically connected to the switching element, configured to generate a partition data signal; and a graphics generator, electrically connected to the switching element, configured to generate an image signal; and a microcontroller, configured to provide a switching control signal, wherein the switching element receives the partition data signal from the graphics processor or receives the image signal from the graphics generator according to a switching control signal indicating the backlight device operates in a safe mode or a normal mode from the microcontroller, wherein when the transport device is in a normal driving state, the switching control signal is at a logic low level, so that the backlight device operates in a normal mode, the switching element receives the partition data signal, and different blocks of the backlight device have different levels of brightness, wherein when the transport device is reversing or just starting up, the switching control signal is at a logic high level, so that the backlight device operates in a safe mode, the switching element receives the image signal, so that different blocks of the backlight device have the same level of brightness.

2. The transport device as claimed in claim 1, wherein the graphics processor receives an input image signal through a receiving end, detects the brightness of the input image signal, and generates the partition data signal according to the brightness of the input image signal.

3. The transport device as claimed in claim 1, wherein the backlight device further comprises a backlight signal generator; wherein the backlight signal generator converts the partition data signal or the image signal into a backlight driving signal.

4. The transport device as claimed in claim 3, wherein the backlight device further comprises a backlight module; wherein the backlight module is driven by the backlight driving signal from the backlight signal generator.

5. The transport device as claimed in claim 2, wherein the graphics processor performs image processing on the input image signal to generate an output image signal, and sends out the output image signal through a transmitting end.

6. A method for controlling a transport device with a backlight device comprising a switching element, comprising:

providing a graphics processor to generate a partition data signal;

providing a graphics generator to generate an image signal; and providing a microcontroller to provide a switching control signal, wherein the switching element receives the partition data signal from the graphics processor or receives the image signal from the graphics generator according to the switching control signal indicating the backlight device operates in a safe mode or a normal mode from the microcontroller, wherein when the transport device is in a normal driving state, the switching control signal is at a logic low level, so that the backlight device operates in a normal mode, the switching element receives the partition data signal, and different blocks of the backlight device have different levels of brightness;

when the transport device is reversing or just starting up the switching control signal is at a logic high level, so that the backlight device operates in a safe mode, the switching element receives the image signal, so that different blocks of the backlight device have the same level of brightness.

* * * * *